June 28, 1955  D. F. PECK ET AL  2,711,756
BAFFLE PLATE FOR TANKS
Filed Oct. 26, 1949  2 Sheets-Sheet 2

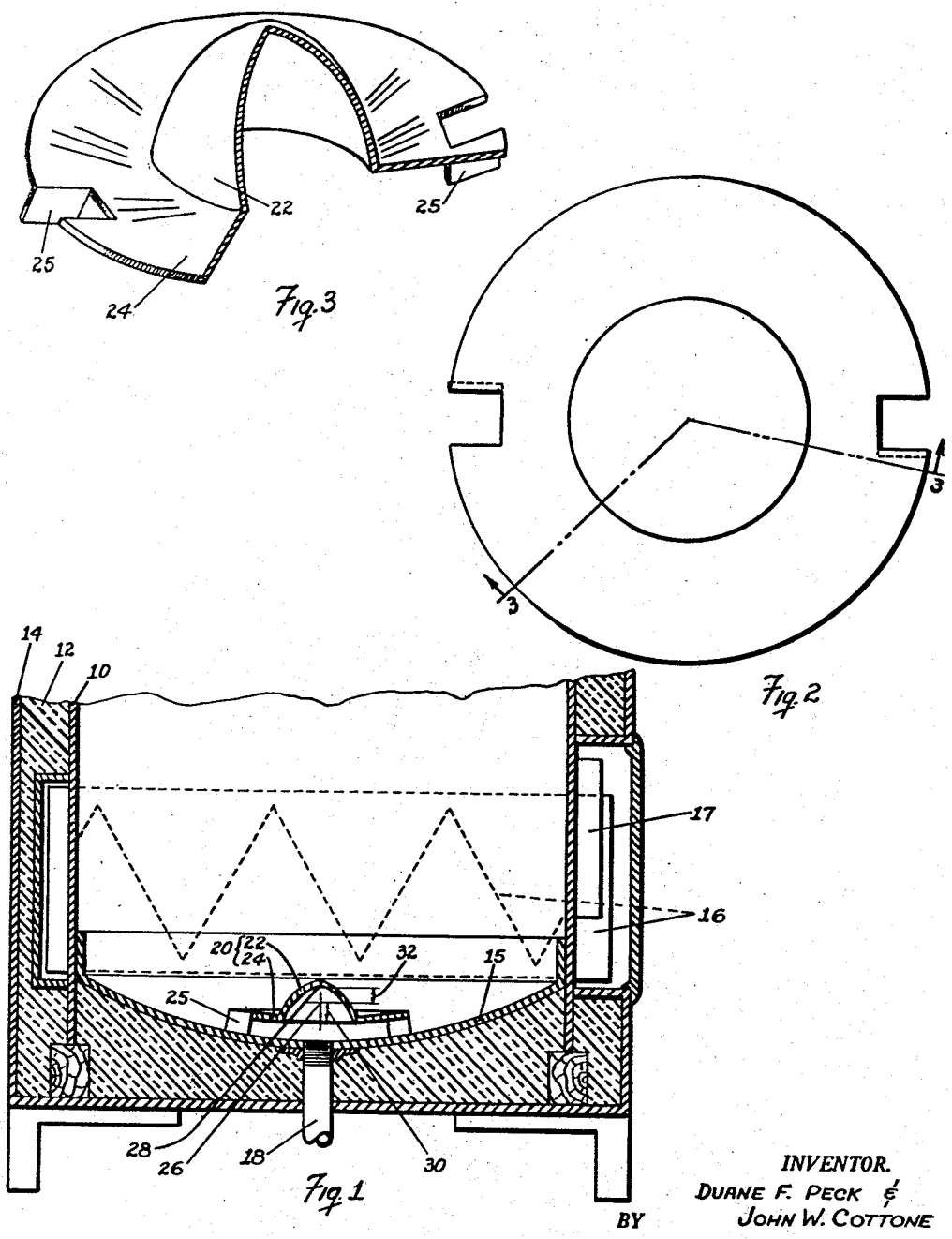

INVENTOR.
DUANE F. PECK &
BY  JOHN W. COTTONE

Oscar W. Jiese

United States Patent Office 2,711,756
Patented June 28, 1955

2,711,756
BAFFLE PLATE FOR TANKS

Duane F. Peck, Chicago, and John W. Cottone, Lombard, Ill., assignors to McGraw Electric Company, Elgin, Ill., a corporation of Delaware Application October 26, 1949, Serial No. 123,678

13 Claims. (Cl. 137—592)

The present invention relates to storage tanks such as are used for water heaters and more particularly to an improved inlet baffle therefor.

Electric energy is widely available at low, off-peak rates for heating water. For example, a heater may be clock-controlled to operate only at night, or to draw power at a lower rate during the night. The water heating installation for such operation includes a storage tank for holding the heated water for use during the day. It has been known that the amount of stored hot water that was available from prior tanks in such systems was less than the volume of the tank because the incoming cold water mixed with the hot water. Hot water is usually drawn off the top under pressure supplied by the cold water admitted at the bottom. Various baffles have been employed for reducing the mixing but usually only about 80–90% of the stored tankful of hot water has been available as such from prior tanks.

It is an object of our present invention to provide a storage tank for hot water or the like in which the incoming fluid is substantially prevented from mixing with fluid already in the tank.

We have determined that certain prior baffles were not completely effective because they merely redirected the compact streams of incoming water and still permitted them to penetrate the body of stored water. Accordingly, it is a further object of our invention to provide a baffle for incoming water that effectively confines the incoming stream and quickly dissipates its momentum to thereby reduce the force of its flow and prevent it from penetrating the main body of stored water.

Further objects include the provision of a simple and low-cost baffle, the provision of a small compact baffle, the provision of new and improved means for controlling the flow of incoming fluid in a tank or the like, and the provision of an improved, storage water heater.

These and other objects and advantages of the invention will become apparent from the following description of certain specific embodiments thereof which illustrate the manner in which the invention may be put into practice. In the drawings:

Figure 1 is a fragmentary, elevational, sectional view of a storage type water heater embodying the present invention;

Fig. 2 is a plan view of the baffle plate shown in Fig. 1;

Fig. 3 is a pictorial view of the same baffle plate, with a section taken along the broken line 3—3 of Fig. 2; and, Figs. 4 and 5 are fragmentary, sectional elevations of water heaters showing modified baffle plates.

Figure 4:
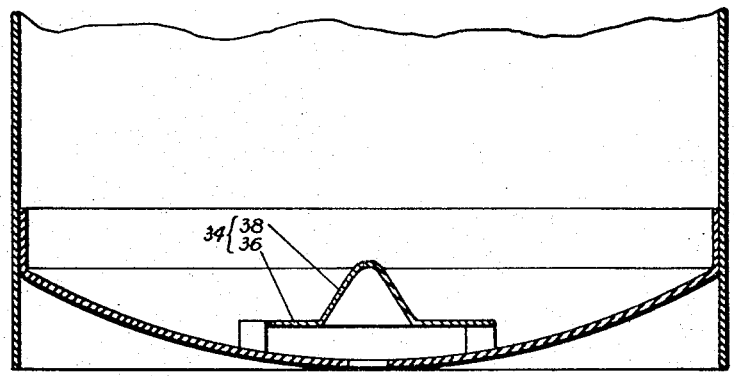

In Fig. 1 the water heater comprises a storage tank 10 surrounded by thermal insulation 12 and enclosed in a casing 14. An electric heating element indicated at 16 surrounds the tank near its lower end for heating the water, and is controlled in the usual manner by a thermostat 17. A cold water inlet comprises a vertical pipe 18 opening through the center of the bottom wall of the tank. An outlet, not shown, is located at the top of the tank. The inlet pipe 18 is to be connected to a cold water supply under pressure so that when the outlet is open, hot water will be expelled by cold water which enters the bottom of the tank.

Centered over the inlet opening is a baffle 20 comprising a cup portion 22 and a flange or rim portion 24. Ears 25 bent down from the flange 24 are welded to the bottom of the tank for supporting the baffle in place. While various sizes and shapes of the cup and flange are suitable, the specific construction shown in Fig. 1 has a cup in the shape of a parabola, the focus 26 of which lies at a point about half the depth of the cup below the peak 28 thereof. The flange 24 is curved to have substantially the same radius of curvature as the bottom wall 15 of the tank and is set substantially parallel thereto. The outer diameter of the flange is about one-third to one-half the internal diameter of the tank and about twice the internal diameter of the cup at the rim. In one specific construction the internal diameter of the tank was 22 inches, the outer diameter of the flange was 8 inches, the internal diameter of the cup at the rim was 4 inches, the depth of the cup was 1⅝ inches (dimension 30 plus dimension 32), and the focal point of the parabola was ⅝ inch below the peak of the cup (dimension 32). The flange was spaced ¾ inch from the bottom wall of the tank, and the inlet opening was a standard ¾ inch steel pipe (.824" inside diameter).

Figure 5:
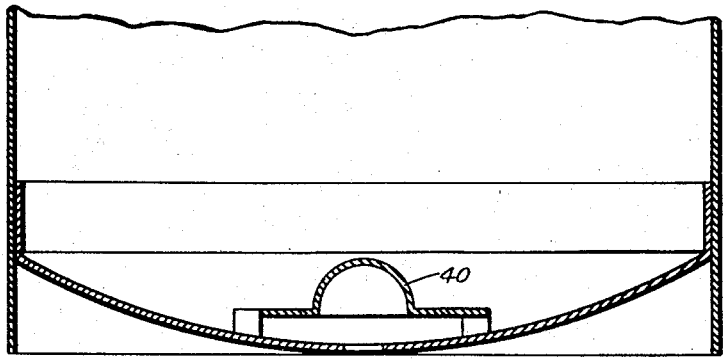

Figs. 4 and 5 show other shapes and sizes of the flange and cup. In the modification of Fig. 4 the baffle 34 comprises a flat annular flange 36 and a cup 38 in the shape of a cone with a rounded top. The cup here is somewhat taller than the parabola of Fig. 1 but has a smaller diameter at its rim. The spacing of the outer edge of the flange 34 from the bottom wall of the tank is about the same spacing as used for the construction of Fig. 1. It is about equal to the diameter of the inlet opening.

The construction of Fig. 5 is similar to that of Fig. 4 but includes a hemispherical cup 40 having a diameter about half that of the flange.

In operation, the tank, including the disc-like, flow space under the baffle and the space within the cup thereof, is filled with water. Incoming cold water issues upward from the inlet pipe 18 as a stream which impinges on the inner surface of the cup and is spread thereby, possibly producing some turbulence for breaking up the stream. The water then issues from the cup and flows radially outward through the space between the flange 24 and the bottom of the tank. This outward path is divergent in that the cross-sectional area of the outwardly flowing stream increases as the stream moves outward. If the flow is the same in all directions, the rate of flow of the water issuing from under the edge of the flange 24 will be the same at all points and will be very slow compared to the flow at the mouth of the inlet pipe 18. Assuming the specific dimensions previously given as an example, the speed of the water issuing from the edge of the baffle will be less than ⅟₃₀ of the speed in the pipe 18. This flow is so gentle that it causes little or no penetration of the stored water by the incoming stream. Rather the incoming water simply displaces the water previously there with very little turbulence at the boundary between the hot and cold water. For example, with this construction we have been able to achieve a draw-off of 97% or 98% as measured by the standard NEMA test for domestic storage water heaters, the conditions of which are substantially as follows: after the tank has been heated for 24 hours under control of the thermostat set to shut off when the water is at 150° F., without any draw-offs during that time, the power is disconnected just after the thermostat shuts off and, with the cold water supply at 50° F., hot water is withdrawn at 5 gallons per minute (regardless of tank size), the temperature of the delivered water measured, and the number of gallons of water withdrawn before the temperature thereof drops 30° F. is determined. Typically, in such a test the present invention will show a drop of 1° F. in the outlet temperature only after 75% of the tank capacity has been withdrawn and a drop of 5° F. only after 90%.

The volume of hot water lost by mixing is likely to be greatest in a tank of large diameter, but probably is substantially independent of the height of the tank. Consequently the results of such a test will depend somewhat on the size and shape of the tank itself. Furthermore a small amount of water in the bottom may not be fully heated. In the tank of Fig. 1, the heater 16 will generally deliver heat very slowly to water below its lowermost edge, so that the small amount of water in the concavity of the bottom head 15 may remain somewhat cooler. This small amount of cool water must account for part of the 2 or 3% of tank capacity that is not available as water above 120° F. in this test, so it is evident that very little mixing occurs. This 2 or 3% amounts to only 4 or 6 quarts in a 50 gallon tank. It is more than the volume under the baffle 20 but about equal to the volume of unheated water below the bottom of the electric heating element.

While the size and shape of the cup of the baffle may be varied somewhat without substantially affecting the results, mixing is increased if the cup is too small. The extreme condition consisting of a plate with no cup at all corresponds to one type of baffle used heretofore. We have found that with such a baffle the water does not flow out uniformly around the edge of the baffle but usually issues from it in one or more distinct streams of small cross-section and considerably penetrating ability. We have further found that there is a best value for the spacing between the flange and the bottom of the tank. Perhaps the reason is that if the spacing is too small the outflowing water has more penetrating ability because it has a higher speed of flow, and that if the spacing is too large the water does not flow out uniformly in all directions. We have found that these differences are not extremely sensitive and accordingly the best spacing for a particular baffle in a particular tank can be determined by straightforward tests.

It will be recognized that the invention is capable of modifications and variations within the scope of the claims.

We claim:

1. The combination with a tank having an inlet opening through a wall thereof for conducting fluid thereto, of a baffle in said tank for controlling the flow of fluid entering said tank through said opening, said baffle comprising a cup, the concavity of which is open to and faces the opening of said inlet, and an approximately annular flange extending out from the rim of said cup, the outer diameter of the flange being substantially twice the diameter of the cup opeing at its rim, and means supporting said baffle in a fixed position with said flange approximately parallel to and spaced from said wall of said tank.

2. The combination of claim 1 wherein said cup has the shape of a parabola.

3. The combination of claim 1 wherein said cup has the form of a parabola the focal point of which is within the cup.

4. The combintion of claim 1 wherein the flange has a contour similar to that of the wall of the tank and is spaced at a substantially uniform distance therefrom, said spacing being approximately equal to the maximum diameter of the inlet opening.

5. The combination of claim 1 wherein the said cup is substantially in the form of a hemisphere.

6. The combination of claim 1 wherein said cup is substantially in the form of a blunted cone.

7. The combination of claim 1 wherein the spacing of said flange at the outer edge thereof is approximately equal to the maximum diameter of the inlet opening and wherein the diameter of the cup is larg compared to that of said inlet opening.

8. The combination with a tank for storing fluid and for dispensing fluid therefrom by introducing new fluid which may have a higher specific gravity, of an inlet and baffle construction for introducing the new fluid into the bottom of the tank with a minimum of mixing of new and old fluid, comprising inlet means approximately at the center of the bottom wall of the tank including flow directing surfaces for directing the incoming stream upward, and a baffle member comprising a cup the concavity of which overlies and faces said inlet, said baffle comprising also a flange extending out from the rim of said cup, the outer diameter of the flange being substantially twice the diameter of the cup-opening at its rim, and means for supporting said baffle and spacing it above the inlet means and above the wall of the tank with said flange approximately parallel to the bottom wall.

9. The combination of claim 8 wherein the inner surface of said cup is smoothly curved.

10. The combination of claim 8 wherein said cup is smoothly curved in the shape of a parabola, the focal point of which is within the cup.

11. The combination of claim 10 wherein the flange is substantially annular, the diameter of the cup-opening is large compared to the maximum diameter of the inlet opening, and the spacing of the flange from the bottom wall of the tank is approximately equal to said maximum diameter of said inlet opening.

12. The combination of claim 8 wherein the diameter of the cup is between four and five times the diameter of the inlet opening.

13. The combination of claim 8 wherein the depth of the cup is substantially twice the diameter of the inlet opening.

References Cited in the file of this patent

UNITED STATES PATENTS

| Number | Name | Date |
|---|---|---|
| 945,254 | Welborn | Jan. 4, 1910 |
| 1,087,242 | Kelly | Feb. 17, 1914 |
| 1,313,797 | De Milt | Aug. 19, 1919 |
| 1,321,235 | McCann | Nov. 11, 1919 |
| 1,762,215 | Dahlquist | June 10, 1930 |
| 2,123,809 | Seitz | July 12, 1938 |
| 2,207,057 | Gulick | July 9, 1940 |
| 2,485,689 | Baumann | Oct. 25, 1949 |
| 2,598,195 | Smith | May 27, 1952 |

FOREIGN PATENTS

| 158,473 | Switzerland | Feb. 1, 1933 |